(12) United States Patent
Miranda Nieto et al.

(10) Patent No.: US 10,065,529 B1
(45) Date of Patent: Sep. 4, 2018

(54) CHILD SAFETY SEAT ANCHOR ASSEMBLY

(71) Applicant: Ford Global Technologies, LLC, Dearborn, MI (US)

(72) Inventors: Jorge Adolfo Miranda Nieto, Guanajuato (MX); Miguel Angel Erales, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/439,373

(22) Filed: Feb. 22, 2017

(51) Int. Cl.
*B60N 2/28* (2006.01)
*B60N 2/00* (2006.01)
*B60N 2/06* (2006.01)

(52) U.S. Cl.
CPC ............ *B60N 2/002* (2013.01); *B60N 2/06* (2013.01); *B60N 2/28* (2013.01); *B60N 2/2887* (2013.01)

(58) Field of Classification Search
CPC . B60N 2/002; B60N 2/06; B60N 2/28; B60N 2/2887; B60N 2/289; B60N 2/2893
See application file for complete search history.

(56) References Cited

U.S. PATENT DOCUMENTS

| | | | |
|---|---|---|---|
| 5,690,356 A * | 11/1997 | Lane, Jr. ............... | B60N 2/002 180/273 |
| 5,871,063 A | 2/1999 | Young | |
| 6,002,325 A | 12/1999 | Conaway | |
| 6,371,516 B1 * | 4/2002 | Miyagawa ............. | B60N 2/002 200/43.04 |
| 6,419,199 B1 * | 7/2002 | Skofljanec ............... | B60N 2/28 24/633 |
| 6,522,257 B1 * | 2/2003 | Jakob ..................... | B60N 2/002 200/61.58 B |
| 6,561,543 B1 * | 5/2003 | Hamada ................. | B60N 2/002 280/734 |
| 6,846,012 B2 * | 1/2005 | Baskin ................... | B60N 2/002 280/735 |
| 7,021,709 B2 * | 4/2006 | Dolan .................... | B60N 2/002 280/735 |
| 7,159,686 B2 * | 1/2007 | Martinez ........... | B60R 21/01556 180/286 |
| 7,168,738 B2 * | 1/2007 | Garcia, Jr. ............. | B60N 2/002 180/268 |
| 7,410,214 B2 * | 8/2008 | Hayden ................. | B60N 2/002 280/735 |
| 7,566,073 B2 | 7/2009 | Shin | |
| 8,610,569 B2 * | 12/2013 | Lanta ..................... | B60N 2/002 180/272 |
| 2005/0189805 A1 | 9/2005 | Burley et al. | |

* cited by examiner

*Primary Examiner* — Philip F Gabler
(74) *Attorney, Agent, or Firm* — Vichit Chea; Price Heneveld LLP

(57) ABSTRACT

The problem of a front seat occupant moving the front seatback so far so as to interfere with the proper positioning of a rear-facing child safety seat or to touch a child's legs while sitting in a front-facing child safety seat is solved by transforming the lower anchor into a segment of an electrical circuit with a normally open switch that is forced to the closed position when a child safety seat attachment system has attached to the lower anchor and the vehicle prevents the front seat from moving beyond a present distance toward the rear seat. The closing of the electrical circuit can be used to supply an input signal to a controller in the vehicle programmed to notify the operator that a child safety seat has been attached to prevent the front seat from moving beyond a fixed distance from the rear seat.

17 Claims, 10 Drawing Sheets

CHILD SAFETY SEAT ANCHOR ASSEMBLY

FIELD OF THE INVENTION

The present invention generally relates to child safety seat lower anchor assemblies in passenger vehicles and a method to prevent a front seat from interfering with a child safety seat located behind the front seat.

BACKGROUND OF THE INVENTION

Since the invention of the automobile, automobile manufacturers have prioritized passenger safety. From seat belts to inflatable air bags to headlights, automobile manufacturers provide many features to increase passenger safety. These safety features have prevented innumerable injuries.

At some point since the invention of the automobile, child safety seats for use in the automobile were developed. These child safety seats provide greater protection for the child occupant in the event of a collision. Some countries now have laws requiring the use of a baby car seat designed specifically for children two years of age and younger. In addition, some countries have laws requiring children older than two years but under a set height (such as 4 feet 9 inches) to use a "booster" seat that places the child in a better position to use a seat belt. The term "child safety seat" encompasses, but is not limited to, both a baby car seat and a booster seat, and includes both a rear-facing child safety seat and a forward-facing child safety seat.

International standards have been developed regulating the position of attachment points on a vehicle seat to which a child safety seat can be attached. These international standards are sometimes referred to as "ISOFIX" or, in the United States of America, "LATCH." LATCH is an acronym for "Lower Anchors and Tethers for CHildren." Among other things, these international standards require two attachment points, called "lower anchors" or just "anchors," at the base of the seat where the seatback meets the bottom cushion. Typically, the lower anchors are to be spaced approximately 11 inches apart.

A child safety seat, in turn, has matching attachment systems that allow the child safety seat to attach to the lower anchors. Some child safety seats provide a flexible belt connecting the attachment system to the child safety seat. Other child safety seats provide a rigid attachment system.

The use of a child safety seat presents certain problems. For example, a child safety seat only works for its intended purpose of increasing child occupant safety when the seat is properly attached. However, heretofore, vehicles have not provided the operator with any indication that a child safety seat is fully attached to both of the lower anchors. Thus, a vehicle operator cannot be certain that the child safety seat has been properly attached to the lower anchors.

In addition, a front seat occupant may inadvertently move the front seatback toward the child safety seat and interfere with the child safety seat or the child occupant. The front seat occupant may move the front seatback into the structure of the child safety seat, when the child safety seat is rear facing, moving the child safety seat out of a position optimal for child safety. The front seat occupant may move the front seatback into the child's legs, when the child safety seat is front facing. Heretofore, vehicles have not prevented the front seat from interfering with child safety seats or occupants thereof in these manners.

SUMMARY OF THE INVENTION

According to one aspect of the present invention, a lower anchor assembly comprises a segment of an electrical circuit comprising a lower anchor and a normally open switch, the normally open switch having a first position and a second position, wherein, in the first position, the normally open switch is not in electrical communication with the lower anchor and the segment of an electrical circuit is open, and, in the second position, the normally open switch is in electrical communication with the lower anchor and the segment of an electrical circuit is closed. The closing of this segment of the electrical circuit can be used to supply an input signal to a controller in the vehicle programmed to notify the operator that a child safety seat has been attached, solving the problem of a vehicle operator not knowing whether a child safety seat has been properly attached to a lower anchor.

Embodiments of the first aspect of the invention can include any one or a combination of the following features:
- the lower anchor assembly further comprising a non-conductive separator, the normally open switch including an electrically conductive portion and the lower anchor including an electrically conductive portion, wherein the normally open switch and the lower anchor are attached together with a non-conductive separator separating the electrically conductive portion of the normally open switch from the electrically conductive portion of the lower anchor;
- the lower anchor comprising a U-shaped terminal portion having an inside width, the normally open switch further comprising a U-shaped terminal portion also having an inside width, wherein the inside width of the U-shaped terminal portion of the lower anchor is approximately equal to the inside width of the U-shaped terminal portion of the normally open switch;
- the normally open switch including a rounded edge, wherein the rounded edge is rounded in a direction toward the lower anchor; and
- the normally open switch further comprising a bend that acts as a spring maintaining the normally open switch in the first position unless forced into the second position.

According to a second aspect of the present invention, a method of preventing a front seat occupant in a vehicle from interfering with a child safety seat or child safety seat occupant located behind the front seat comprises: presenting a vehicle including a pair of lower anchor assemblies each comprising a segment of an electrical circuit comprising a lower anchor, a normally open switch having a first position and a second position, wherein, in the first position, the normally open switch is not in electrical communication with the lower anchor and the segment of an electrical circuit is open, and, in the second position, the normally open switch is in electrical communication with the lower anchor and the segment of the electrical circuit is closed, a front seat, and a rear seat located behind the front seat, the rear seat including a seatback and a bottom cushion, the pair of lower anchor assemblies accessible between the seatback and the bottom cushion, the front seat having a first position, a second position nearer the rear seat than the first position, and a third position nearer the rear seat than the second position; presenting a child safety seat comprising a lower anchor attachment system including a pair of clips; placing the child safety seat onto the bottom cushion of the rear seat; connecting one of the clips to one of the pair of lower anchor assemblies, thus forcing the normally open switch of one of the lower anchor assemblies to the second position; connecting the other clip to the other of the pair of lower anchor assemblies, thus forcing the normally open switch of the other lower anchor assembly to the second position; and allowing the front seat to move from the first position to the second position but not beyond the second position to the third position. This method solves the problem of a front seat occupant moving the front seatback so far so as to interfere with the proper positioning of a rear-facing child safety seat or to touch the child's legs while sitting in a front-facing child safety seat.

Embodiments of the second aspect of the invention can include any one or a combination of the following features:

the vehicle further including a child safety seat indicator display having a first value and a second value, wherein the child safety seat indicator display displays the first value when the normally open switch of at least one of the pair of lower anchor assemblies is in the first position and the child safety seat indicator displays the second value when the normally open switch of both of the pair of lower anchor assemblies are in the second position, the method further comprising displaying the second value; and moving the front seat to a position ranging from the first position to the second position, if the front seat is in the third position.

According to a third aspect of the present invention, a vehicle rear seat comprises a pair of lower anchor assemblies accessible between a seatback and a bottom cushion, wherein each of the pair of lower anchor assemblies comprise a segment of an electrical circuit comprising a lower anchor, a normally open switch having a first position and a second position, wherein, in the first position, the normally open switch is not in electrical communication with the lower anchor and the segment of an electrical circuit is open, and, in the second position, the normally open switch is in electrical communication with the lower anchor and the segment of the electrical circuit is closed.

Embodiments of the third aspect of the invention can include any one or a combination of the following features:

each of the pair of lower anchor assemblies further comprising a non-conductive separator, the normally open switch including an electrically conductive portion and the lower anchor including an electrically conductive portion, wherein the normally open switch and the lower anchor are attached together with a non-conductive separator separating the electrically conductive portion of the normally open switch from the electrically conductive portion of the lower anchor;

the lower anchor comprising a U-shaped terminal portion having an inside width, the normally open switch further comprising a U-shaped terminal portion also having an inside width, wherein the inside width of the U-shaped terminal portion of the lower anchor is approximately equal to the inside width of the U-shaped terminal portion of the normally open switch;

the normally open switch including a rounded edge, wherein the rounded edge is rounded in a direction toward the lower anchor; and the normally open switch further comprising a bend that acts as a spring maintaining the normally open switch in the first position unless forced into the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
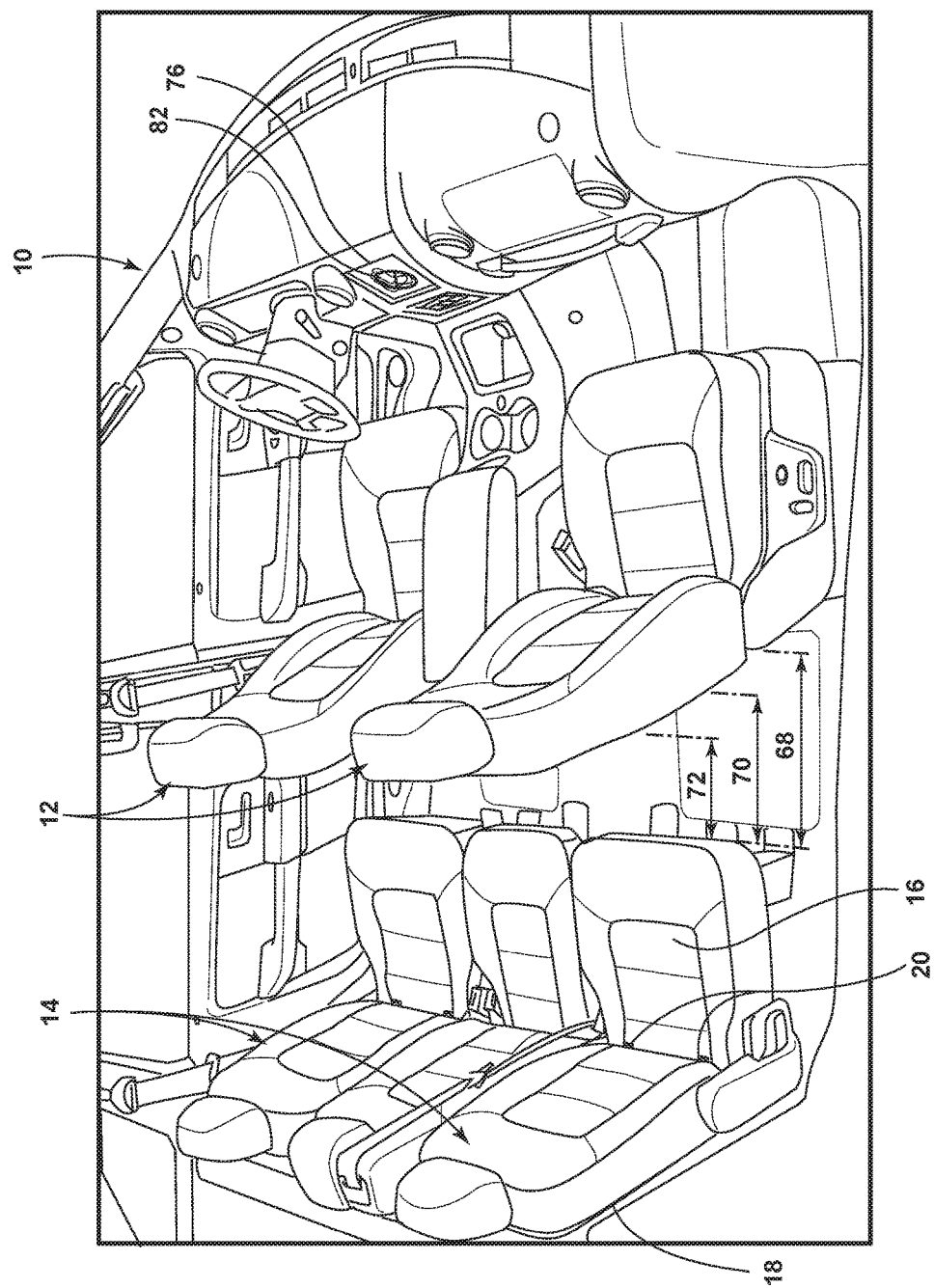
FIG. 1 is a perspective view of an interior of an automobile illustrating lower anchors disposed within a rear seat.

Referring to FIG. 1, an interior of a vehicle 10 is illustrated, along with a pair of front seats 12 disposed near the front of the vehicle 10 and rear seats 14 disposed behind the front seats 12. Instead of separate front seats 12, the vehicle may have one large front seat 12. Many vehicles 10 include an electronic dashboard display 76, which can provide vehicle operational information, climate controls, entertainment controls, navigation displays, etc.

A front seat 12 is typically movable relative to the rear seat 14. For example, the front seat 12 can be located in a first position 68 relative to the rear seat 14, defined by a distance from the rear seat 14. In addition, the front seat 12 can be located in a second position 70 relative to the rear seat 14. In the second position 70, the front seat 12 is nearer to the rear seat 14 than when the front seat 12 is in the first position 68. Further, the front seat 12 can be located in a third position 72 relative to the rear seat 14. In the third position 72, the front seat 12 is nearer to the rear seat 14 than when the front seat 12 is in the second position 70. If the front seat 12 were in the third position 72, the front seat 12 would be so close to the rear seat 14 that it would interfere with a child safety seat 22 that was placed on the rear seat 14 or collide with a child 74 (see FIGS. 6A and 6B) occupying the child safety seat 22. Therefore, when a child safety seat 22 (see FIG. 2A) is placed onto the rear seat 14, the front seat 12 should be able to move from the first position 68 to the second position 70 but not beyond the second position 70 to the third position 72.

The rear seat 14 typically includes a bottom cushion 16 and a seatback 18. Lower anchors 20 to which a child safety seat 22 could attach are disposed generally where the bottom cushion 16 meets the seatback 18. Some vehicles may use a third row of seating, utilizing one or more rear seats 14 each with their own pair of lower anchors 20. Sometimes the lower anchors 20 are recessed between the bottom cushion 16 and seatback 18, making visual inspection difficult. Lower anchors 20 are typically made from metal, which is a conductor of electricity.

Figure 2A:
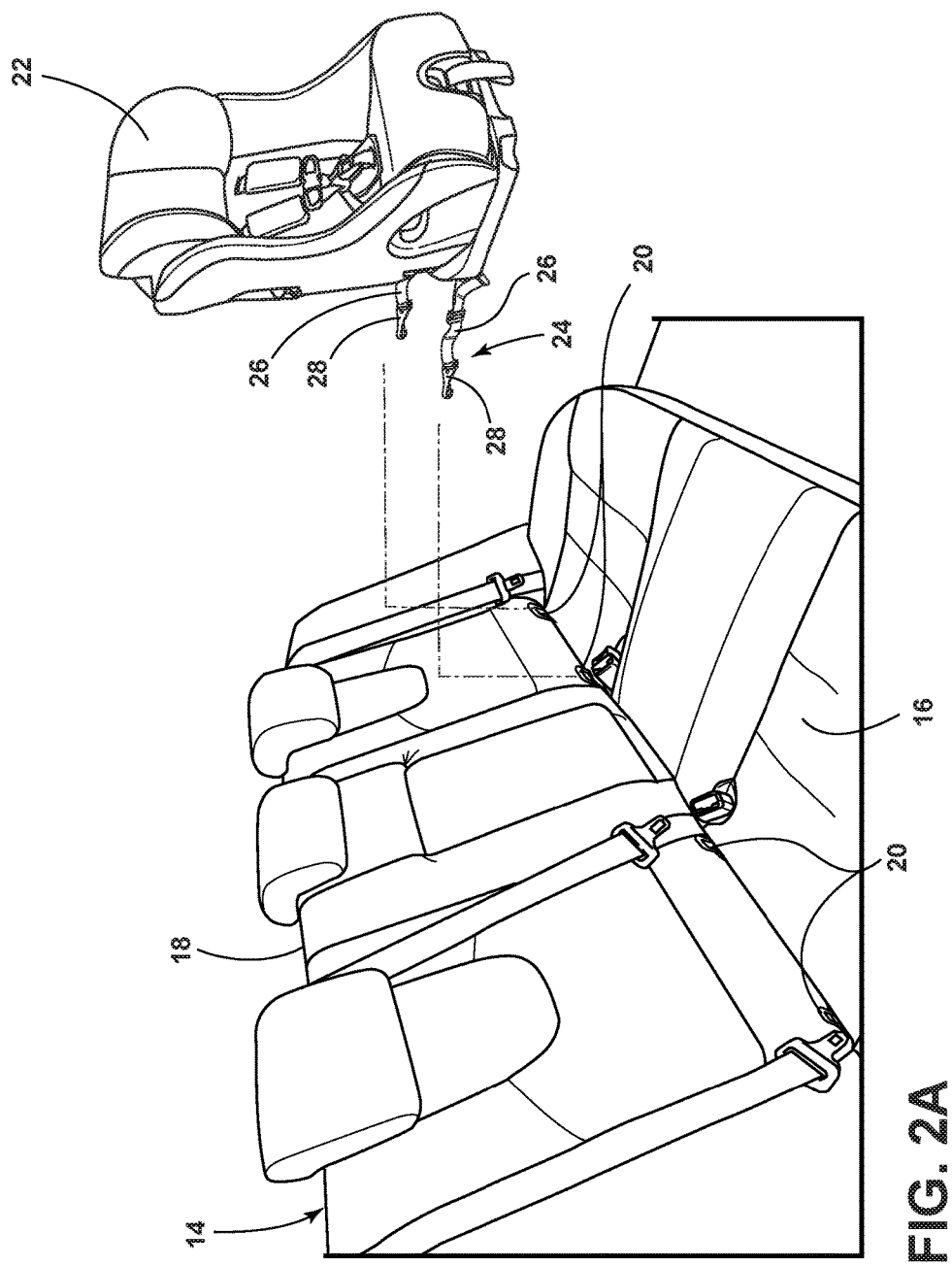
FIG. 2A is a perspective view of child safety seat illustrating one embodiment of a lower anchor attachment system.
Figure 2B:
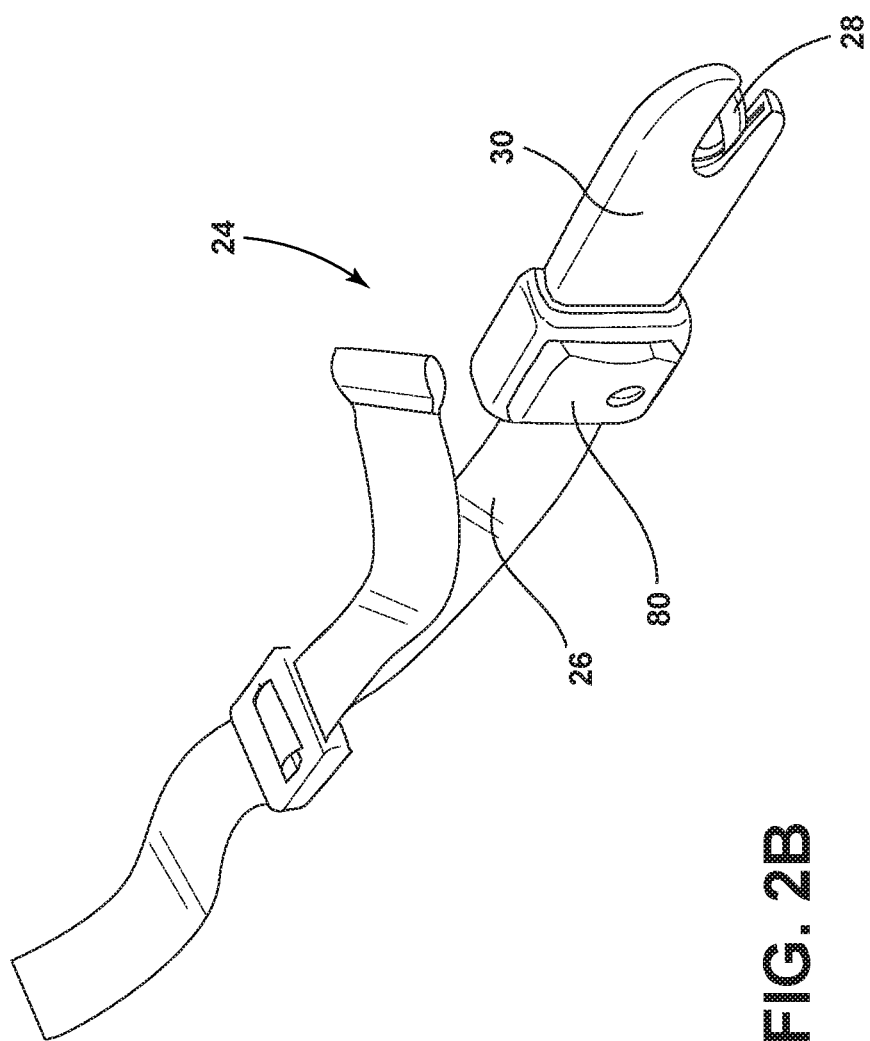
FIG. 2B is a perspective close up view of another embodiment of a lower anchor attachment system, illustrating an anchor clip housed within an elongated housing.
Figure 3:
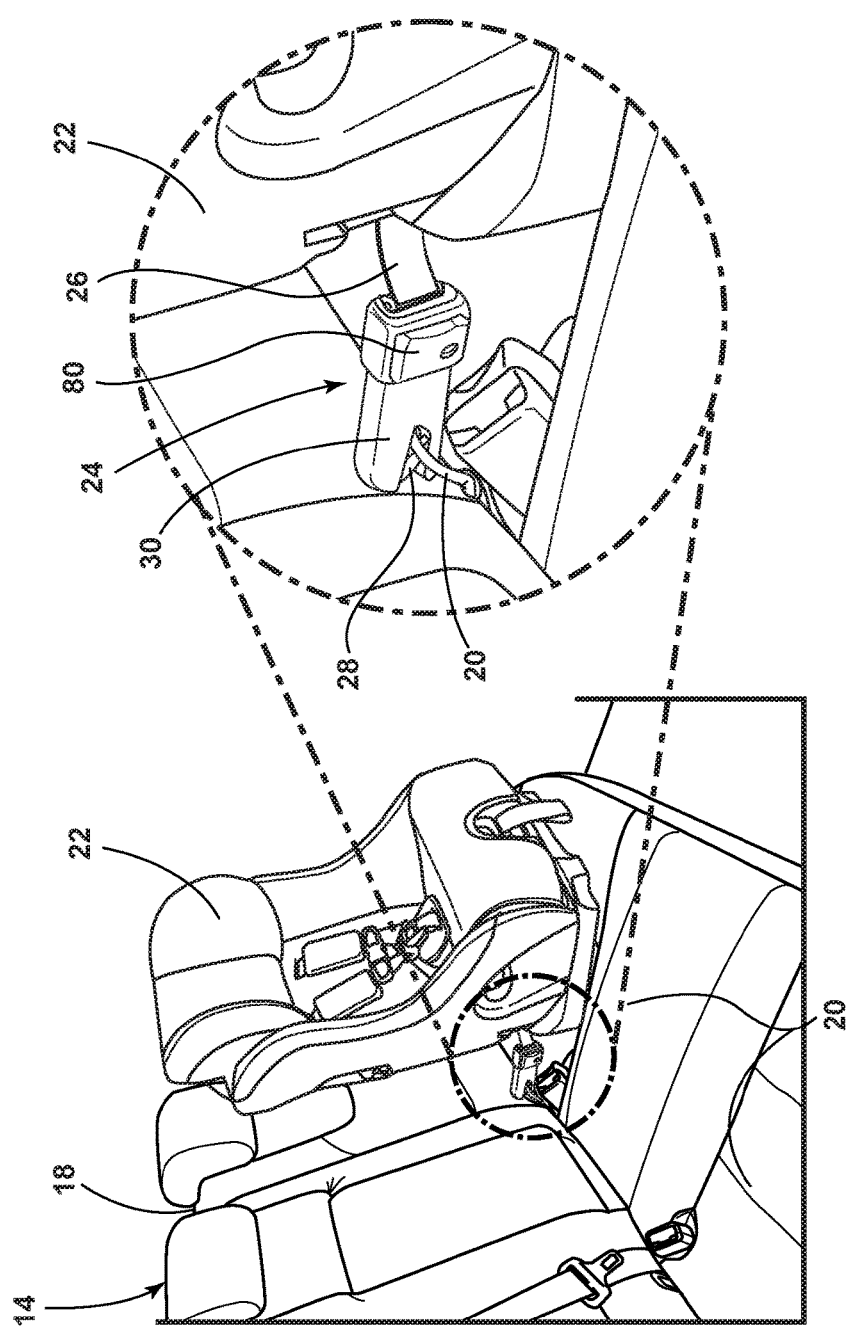
FIG. 3 is a perspective view of a child safety seat attached to a rear seat with a close up illustration of a clip attached to a lower anchor.

Referring to FIG. 2A, a typical front-facing child safety seat 22 is illustrated. The child safety seat 22 includes an attachment system 24 to attach the child safety seat 22 to a pair of lower anchors 20. The attachment system 24 illustrated here includes a flexible strap 26 and a pair of clips 28. Some child safety seats 22 house a clip 28 within an elongated rigid housing 30, as illustrated in FIG. 2B. A release button 80 releases the clip 28, allowing the clip 28 to disconnect from a lower anchor 20. In use, a vehicle user will place the child safety seat 22 onto a rear seat 14, attach one clip 28 to a lower anchor 20 and attach the other clip 28 to the other lower anchor 20. FIG. 3 illustrates a child safety seat 22 installed on a rear seat 14, with one clip 28 properly attached to a lower anchor 20 on the left side and the other clip 28 properly attached to another lower anchor 20 on the right side.

Figure 4A:
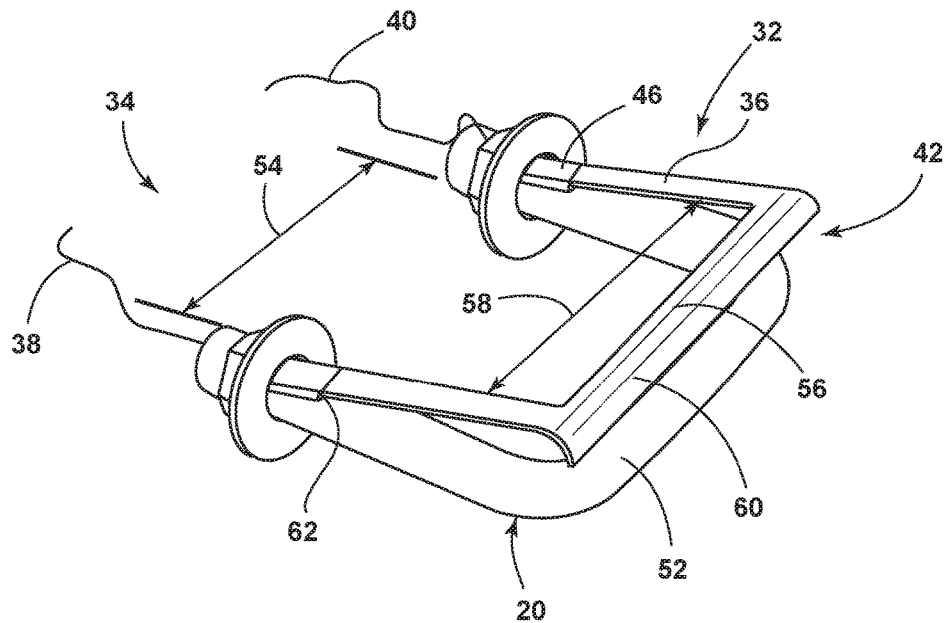
FIG. 4A is a perspective view of a lower anchor assembly, according to one embodiment, illustrating a normally open switch in a first position.
Figure 4B:
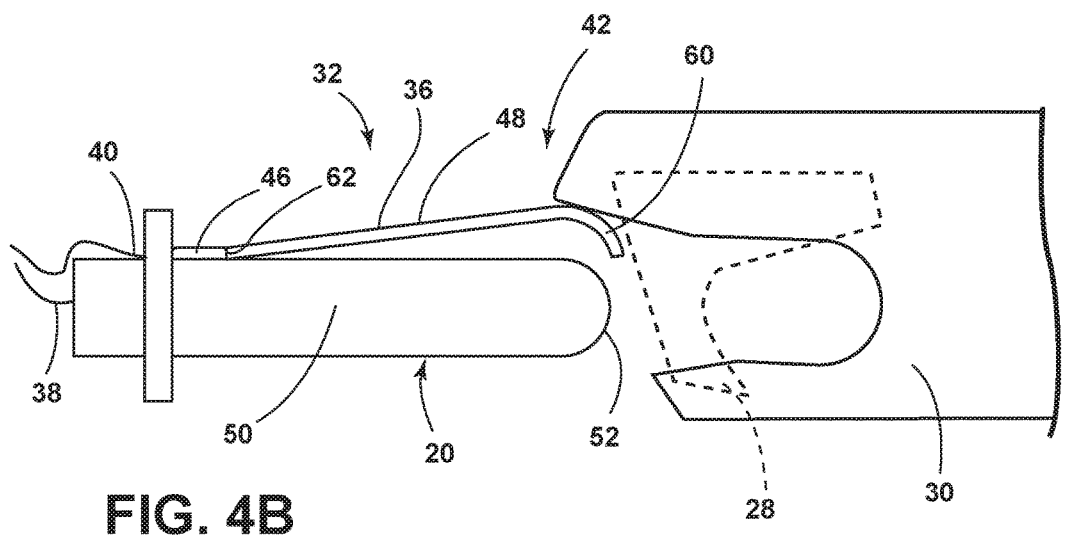
FIG. 4B is a side view of a lower anchor assembly, according to one embodiment, illustrating a normally open switch in a first position.

Referring to FIG. 4A, an embodiment of a lower anchor assembly 32 is illustrated. In this embodiment, the lower anchor assembly 32 comprises a segment of an electrical circuit 34 (see FIGS. 5A and 5B for the segment of an electrical circuit 34 forming part of an example complete circuit, discussed more fully below). The segment of an electrical circuit 34 comprises a lower anchor 20 and a normally open switch 36. The normally open switch 36 includes an electrically conductive material, such as metal. The lower anchor 20 is in electrical communication with a conductive wire 38 and the normally open switch 36 is in electrical communication with a conductive wire 40. The normally open switch 36 is here illustrated in a first position 42. In this first position 42, the normally open switch 36 is not in electrical communication with the lower anchor 20. Because the normally open switch 36 is not in electrical communication with the lower anchor 20, this segment of an electrical circuit 34 is open and could not be used to conduct electricity. That is, this segment of an electrical circuit 34 is not closed. The term "normally open" signifies that the switch 36 will not physically be in a position relative to the lower anchor 20 to conduct electricity with the lower anchor 20 unless physically forced into contact with the lower anchor 20 by an outside force. FIG. 4B illustrates a side view of what is illustrated in FIG. 4A.

Figure 4C:
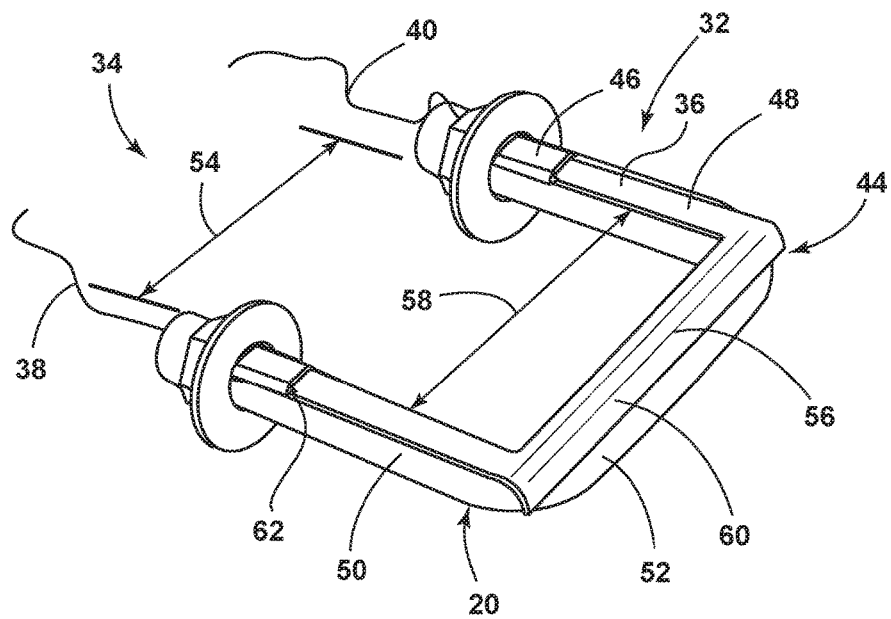
FIG. 4C is a perspective view of a lower anchor assembly, according to one embodiment, illustrating a normally open switch in a closed second position.
Figure 4D:
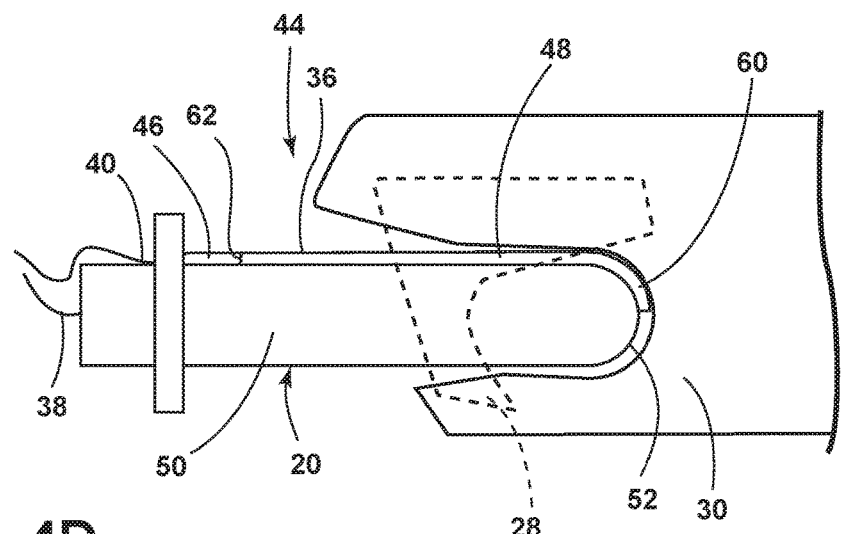
FIG. 4D is a side view of a lower anchor assembly, according to one embodiment, illustrating a normally open switch in a closed second position.

The normally open switch 36 is illustrated in a second position 44, in FIG. 4C. In this second position 44, the normally open switch 36 is in electrical communication with the lower anchor 20. A clip 28 (see FIG. 4D) of a child safety seat 22 has forced the normally open switch 36 to the second position 44. Therefore, this segment of an electrical circuit 34 is closed and can be used to conduct electricity. Because this segment of an electrical circuit 34 is closed, electricity can flow from wire 38, to lower anchor 20, to normally open switch 36, and to wire 40, or the opposite way. FIG. 4D illustrates a side view of what is illustrated in FIG. 4C.

A non-conductive separator 46 separates and therefore dielectrically isolates the metal electrically conductive portion 48 of the normally open switch 36 from the metal electrically conductive portion 50 of the lower anchor 20. The non-conductive separator 46 can be a plastic coating or dielectric jacket covering a portion of the normally open switch 36. Alternatively, the non-conductive separator 46 can be a plastic coating or dielectric jacket covering a portion of the lower anchor 20. The non-conductive separator 46 can be made from any non-conductive material. The point of the non-conductive separator 46 is to allow the normally open switch 36 and the lower anchor 20 to be attached to each other without that attachment forming an electrical connection.

The lower anchor 20 can include a U-shaped terminal portion 52. The U-shaped terminal portion 52 can include an inside width 54. Likewise, the normally open switch 36 can include a U-shaped terminal portion 56 that has an inside width 58. The inside width 58 of the U-shaped terminal portion 56 of the normally open switch 36 can be approximately equal to the inside width 54 of the U-shaped terminal portion 52 of the lower anchor 20. When said inside widths 54 and 58 are approximately equal, the normally open switch 36 will substantially overlap the lower anchor 20 and cover the lower anchor 20 when the normally open switch 36 is forced into the second position 44 thus creating a more stable electrical connection.

The normally open switch 36 can include a rounded edge 60 at the outer end. The rounded edge 60 can be rounded in the direction of the lower anchor 20. The rounded edge 60 facilitates the clip 28 sliding over both the lower anchor 20 and the normally open switch 36 during attachment.

The normally open switch 36 can include a bend 62 that angles the switch upwards. The bend 62 acts as a spring that maintains the normally open switch 36 in the first position 42 and keeps this segment of the electrical circuit 34 open, unless a clip 28 forces the normally open switch 36 downward into the second position 44, thus closing this segment of the electrical circuit 34. The bend 62 could occur approximately at one point, as illustrated in FIGS. 4A-4D, or throughout a length of the normally open switch 36.

As illustrated in FIGS. 2A and 3, and as mentioned above, proper attachment of a child safety seat 22 requires attaching a first clip 28 to a first lower anchor 20 and a second clip 28 to a second lower anchor 20, spaced apart from the first lower anchor 20. Therefore, for a vehicle 10 to provide an enhanced notification that a child safety seat 22 has been installed, both lower anchors 20 utilized could implement an embodiment of the inventive lower anchor assembly 32 described herein. In other words, one lower anchor 20 will make part of a segment of an electrical circuit 34 and the other lower anchor 20 will make part of a separate segment of an electrical circuit 34.

Figure 5A:
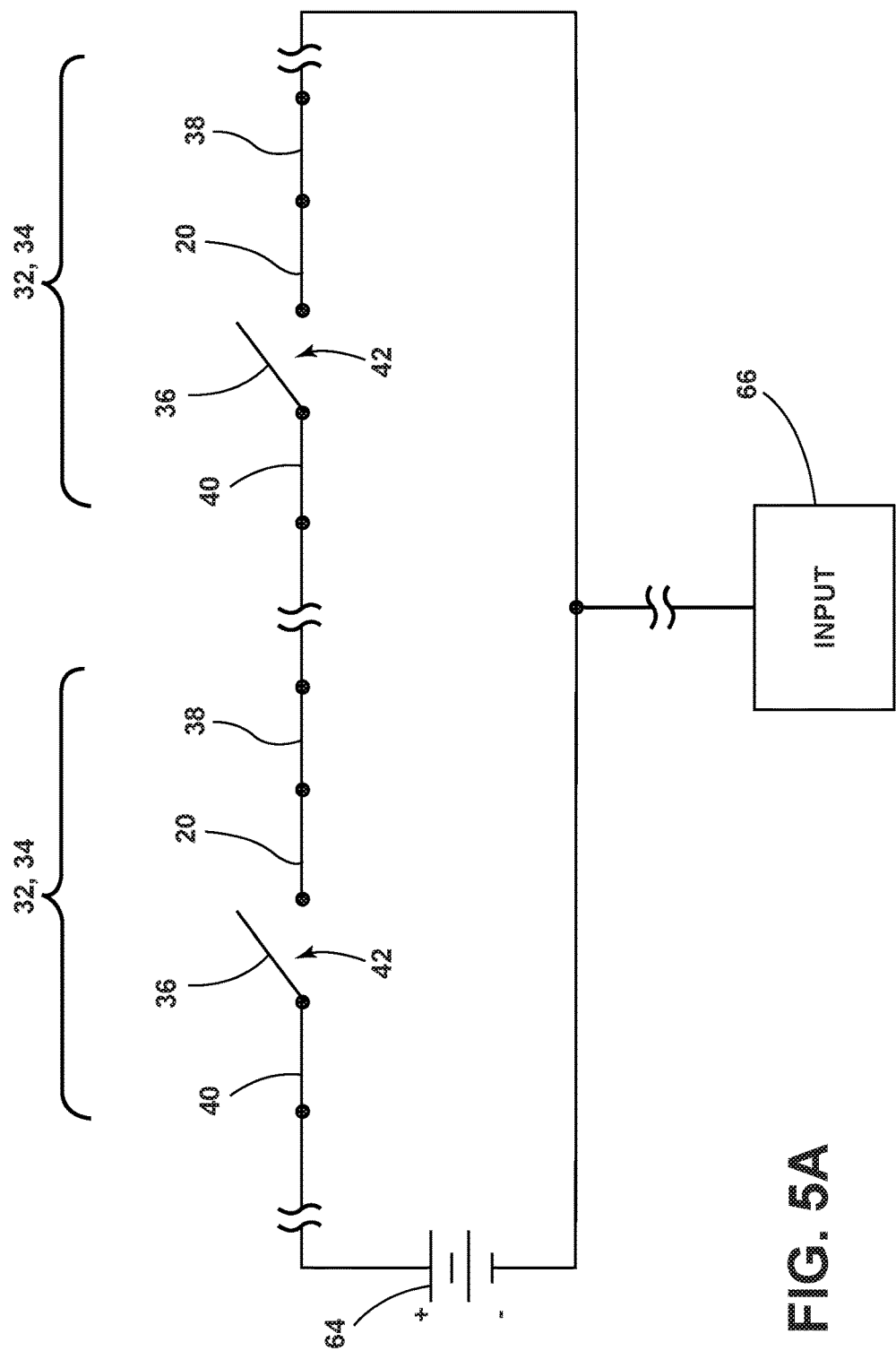
FIG. 5A is an electrical circuit diagram illustrating a pair of lower anchor assemblies wired in series, each having a normally open switch in a first position.

Referring to FIG. 5A, an example electrical circuit diagram is illustrated. This diagram shows a pair of lower anchor assemblies 32 connected in series. More specifically, the figure illustrates a first lower anchor assembly 32 comprising a segment of an electrical circuit 34, which in turn includes a wire 40 electrically connected to a normally open switch 36, a lower anchor 20, and a wire 38 electrically connected to the lower anchor 20. The wire 38 is then electrically connected to the second, spaced apart, lower anchor assembly 32 likewise comprising a segment of an electrical circuit 34, which in turn likewise includes a wire 40 electrically connected to a normally open switch 36, a lower anchor 20, and a wire 38 electrically connected to the lower anchor 20. A power source 64 completes the electrical circuit. The normally open switches 36 are illustrated in FIG.

5A in an open first position 42. Therefore, the electrical circuit is open and electricity is not conducted through the circuit.

Figure 5B:
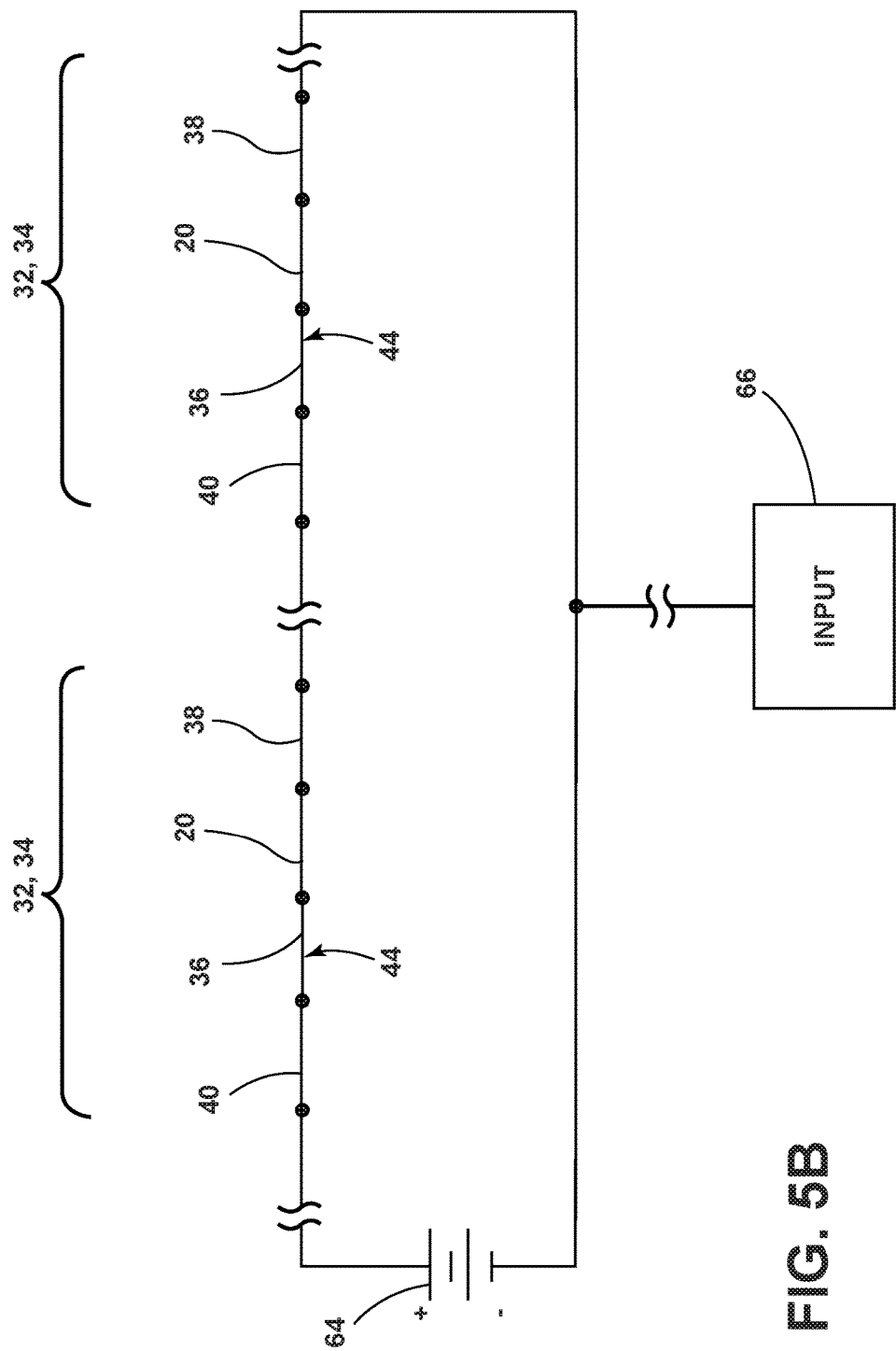
FIG. 5B is an electrical circuit diagram illustrating a pair of lower anchor assemblies wired in series, each having a normally open switch in a closed second position, forming a closed circuit and providing an input.

Referring to FIG. 5B, the same circuit is illustrated as in FIG. 5A, except that now the child safety seat 22 attachment system 24 has forced the normally open switches 36 to the closed second position 44. Therefore, the electrical circuit is closed and electricity can flow through the circuit. If the attachment system 24 has not forced both of the two normally open switches 36 to the second position 44, closing the circuit, then electricity would not be able flow through the circuit. Both clips 28 of the attachment system 24 must be properly attached to the pair of lower anchor assemblies 32 for the circuit to close. Because the circuit is now closed, electricity flows providing an input signal 66 that can be used for a variety of purposes, as discussed more fully below.

The lower anchor assembly 32 can be used as part of a method of preventing a front seat 12 in a vehicle 10 from interfering with a child safety seat 22 or child safety seat occupant 74 located behind the front seat 12. In use, a person could present a vehicle 10 having an embodiment of the inventive lower anchor assembly 32 described herein. Preferably, the vehicle 10 would incorporate a pair of lower anchor assemblies 32, one for both of the clips 28 employed as the attachment system 24 of a child safety seat 22. Each of the two lower anchor assemblies 32 could incorporate a segment of an electrical circuit 34 comprising a lower anchor 20, a normally open switch 36 having a first position 42 and a second position 44. In the first position 42, the normally open switch 36 is not in electrical communication with the lower anchor 20. Thus, in the first position 42, the segment of an electrical circuit 34 is open, i.e., not conductive. In the second position 44, the normally open switch 36 is in electrical communication with the lower anchor 20. Thus, in the second position 44, the segment of an electrical circuit 34 is closed, i.e., conductive.

The vehicle 10 has a front seat 12 and a rear seat 14 located behind the front seat 12. The rear seat 14 includes a seatback 18 and a bottom cushion 16. The pair of lower anchor assemblies 32 are accessible between the seatback 18 and the bottom cushion 16. The front seat 12 has a first position 68, a second position 70 nearer the rear seat 14 than the first position 68, and a third position 72 nearer the rear seat 14 than the second position 70.

The person then can present a child safety seat 22, which includes a lower anchor attachment system 24, which can include a pair of clips 28. The person then can place the child safety seat 22 onto the bottom cushion 16 of the rear seat 14. The person then can connect one of the clips 28 to one of the lower anchor assemblies 32. That forces the normally open switch 36 of the lower anchor assembly 32 at issue to the second position 44. The person then can connect the other clip 24 to the other lower anchor assembly 32, thus likewise forcing the normally open switch 36 of this lower anchor assembly 32 to the second position 44.

Figure 6A:
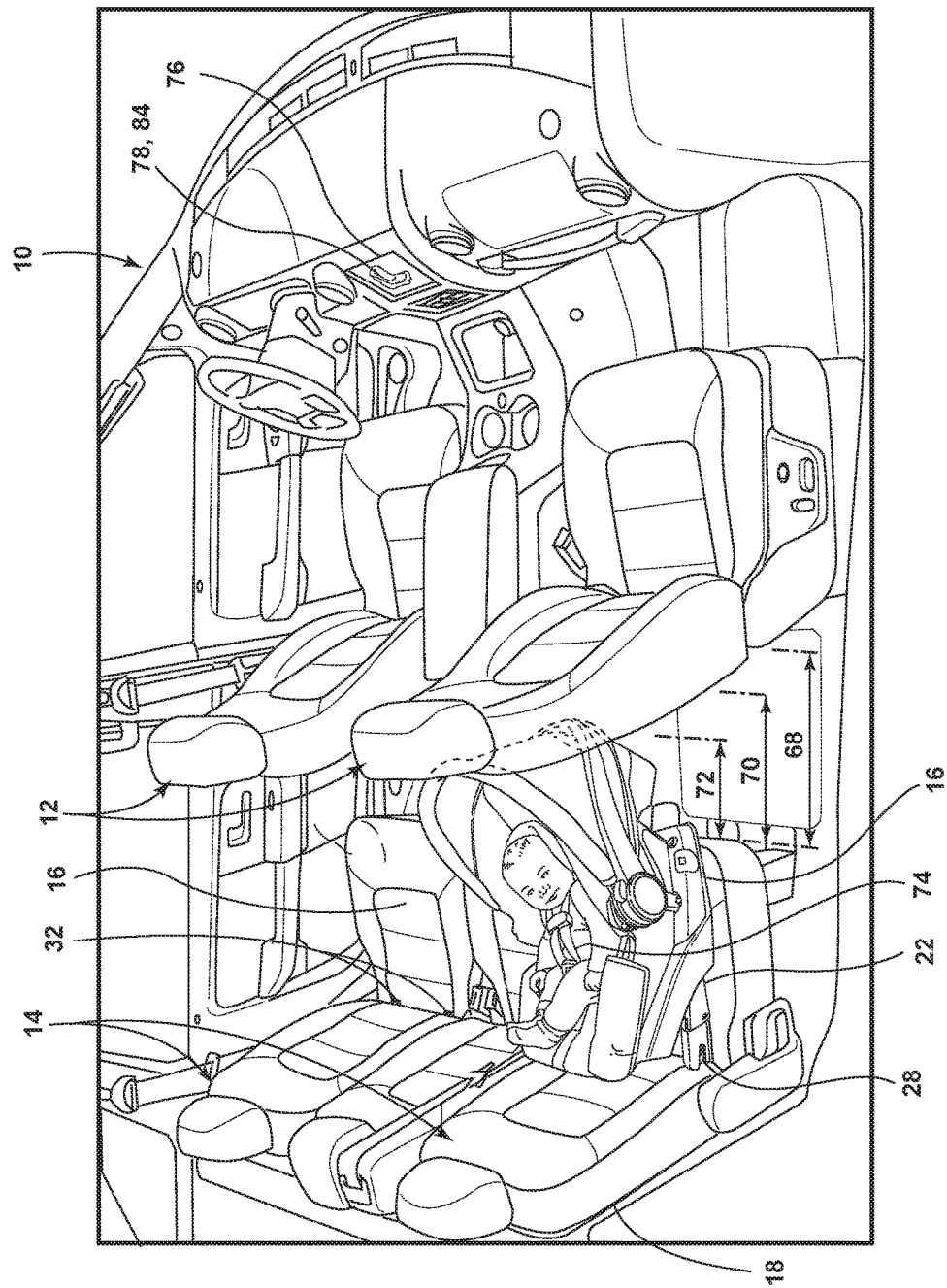
FIG. 6A is a perspective view of a vehicle with a rear-facing child safety seat attached to an embodiment of a lower anchor assembly showing a child safety seat indicator display.
Figure 6B:
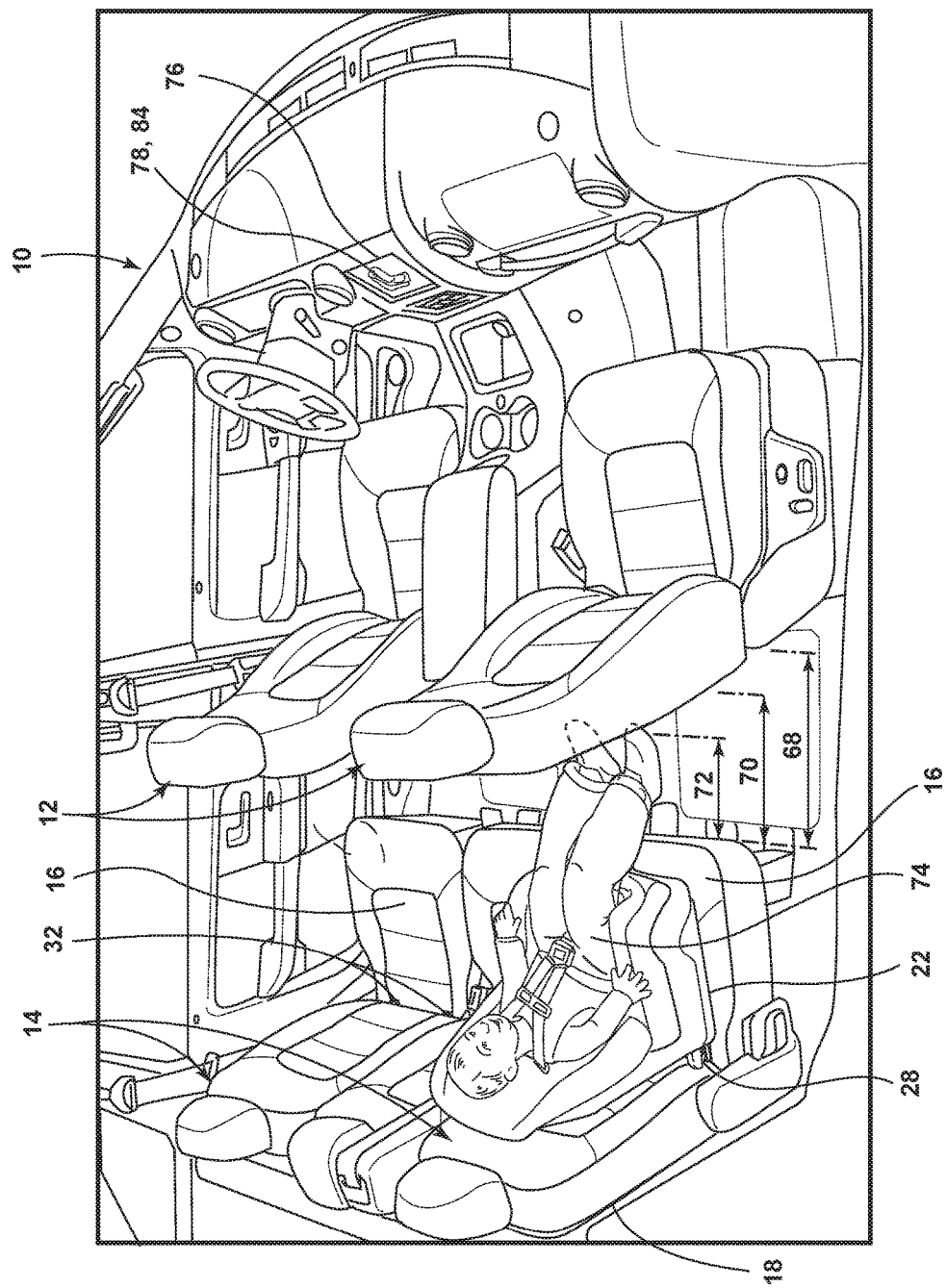
FIG. 6B is a perspective view of a vehicle with a forward-facing child safety seat attached to an embodiment of a lower anchor assembly showing a child safety seat indicator display.

Because the normally open switch 36 of the pair of lower anchor assemblies 32 are now in the second position 44, each segment of the electrical circuit 34, to which the lower anchor assembly 32 belongs, can conduct electricity and provide an input 66. A controller (not shown) can use this input 66 and electronically allow the front seat 12 to move from the first position 68 to the second position 70 but not beyond the second position 70 to the third position 72. Without the input 66, such as when a normally open switch 36 remains open, the controller could have electronically allowed the front seat 12 to move from the first position 68 to the third position 72. By preventing the front seat 12 from moving beyond the second position 70 to the third position 72, this method has prevented the front seat 12 from interfering with the child safety seat 22 (as illustrated in FIG. 6A) or a child 74 occupying the child safety seat 22 (as illustrated in FIG. 6B).

As another feature of this method, the vehicle 10 includes a child safety seat indicator display 78. The child safety seat indicator display 78 could be displayed on a dashboard display 76, such as a graphic on an electronic screen, or as a light not on an electronic screen that can turn on and off. The child safety seat indicator display 78 can have a first value 82 and a second value 84. The first value 82, for example, could indicate "no child safety seat," some statement or graphic providing the same information (such as shown in FIG. 1), or could just be null. The second value 84, for example, could indicate "child safety seat present" or some statement or graphic providing the same information (such as shown in FIGS. 6A and 6B). The indicator display 78 can display the first value 82 when the when the normally open switch 36 of at least one of the pair of lower anchor assemblies 32 to which the child safety seat 22 could be attached is in the first position 42. In this situation, the electrical circuit is open and not generating an input 66 for a controller to use. The indicator display 78 can display the second value 84 when the normally open switch 36 of both of the lower anchor assemblies 32 to which the child safety seat 22 is attached is in the second position 44. In this situation, the electrical circuit is closed and is generating an input 66 for a controller to use. If a child safety seat 22 is properly attached, the vehicle 10 can display the second value 84. When the input 66 is supplied, the controller uses that information to cause (such as via a program) indicator display 78 to display the second value 84 instead of the first value 82.

As another feature of this method, the vehicle 10 can automatically move the front seat 12 to a position ranging from the first position 68 to the second position 70, if the front seat 12 is in the third position 72 when a child safety seat 22 has been properly attached to a pair of lower anchor assemblies 32 described herein, and input 66 is thus generated. More specifically, the controller could notice input 66 and (via a program) use this information to check to see if the front seat 12 is in the third position 72, and if so, instruct a motor to move the front seat 12 away from the third position 72. So moving the front seat 12 away from the third position 72 could prevent the front seat 12 from interfering with the proper position of the child safety seat 22 that has now been attached to the lower anchor assemblies 32 or a child 74 occupying said child safety seat 22.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lower anchor assembly comprising a segment of an electrical circuit comprising a lower anchor and a normally open switch, the normally open switch having a first position and a second position, wherein, in the first position, the normally open switch is not in electrical communication with the lower anchor and the segment of an electrical circuit is open, and, in the second position, the normally open switch is in electrical communication with the lower anchor and the segment of an electrical circuit is closed.

2. The lower anchor assembly of claim 1 further comprising a non-conductive separator, the normally open switch including an electrically conductive portion and the lower anchor including an electrically conductive portion, wherein the normally open switch and the lower anchor are attached together with a non-conductive separator separating the electrically conductive portion of the normally open switch from the electrically conductive portion of the lower anchor.

3. The lower anchor assembly of claim 1, the lower anchor comprising a U-shaped terminal portion having an inside width, the normally open switch further comprising a U-shaped terminal portion also having an inside width, wherein the inside width of the U-shaped terminal portion of the lower anchor is approximately equal to the inside width of the U-shaped terminal portion of the normally open switch.

4. The lower anchor assembly of claim 3, the normally open switch including a rounded edge, wherein the rounded edge is rounded in a direction toward the lower anchor.

5. The lower anchor assembly of claim 1, the normally open switch further comprising a bend that acts as a spring maintaining the normally open switch in the first position unless forced into the second position.

6. A method of preventing a front seat occupant in a vehicle from interfering with a child safety seat or child safety seat occupant located behind the front seat comprising:
   presenting a vehicle including a pair of lower anchor assemblies each comprising
      a segment of an electrical circuit comprising a lower anchor, a normally open switch having a first position and a second position, wherein, in the first position, the normally open switch is not in electrical communication with the lower anchor and the segment of an electrical circuit is open, and, in the second position, the normally open switch is in electrical communication with the lower anchor and the segment of the electrical circuit is closed,
      a front seat,
      and a rear seat located behind the front seat, the rear seat including a seatback and a bottom cushion,
      the pair of lower anchor assemblies accessible between the seatback and the bottom cushion,
      the front seat having a first position, a second position nearer the rear seat than the first position, and a third position nearer the rear seat than the second position;
   presenting a child safety seat comprising a lower anchor attachment system including a pair of clips;
   placing the child safety seat onto the bottom cushion of the rear seat;
   connecting one of the clips to one of the pair of lower anchor assemblies, thus forcing the normally open switch of one of the lower anchor assemblies to the second position;
   connecting the other clip to the other of the pair of lower anchor assemblies, thus forcing the normally open switch of the other lower anchor assembly to the second position; and
   allowing the front seat to move from the first position to the second position but not beyond the second position to the third position.

7. The method of claim 6,
   the vehicle further including a child safety seat indicator display having a first value and a second value, wherein the child safety seat indicator display displays the first value when the normally open switch of at least one of the pair of lower anchor assemblies is in the first position and the child safety seat indicator displays the second value when the normally open switch of both of the pair of lower anchor assemblies are in the second position,
   further comprising displaying the second value.

8. The method of claim 6 further comprising moving the front seat to a position ranging from the first position to the second position, if the front seat is in the third position.

9. A vehicle rear seat comprising a pair of lower anchor assemblies accessible between a seatback and a bottom cushion,
   wherein each of the pair of lower anchor assemblies comprise a segment of an electrical circuit comprising a lower anchor, a normally open switch having a first position and a second position, wherein, in the first position, the normally open switch is not in electrical communication with the lower anchor and the segment of an electrical circuit is open, and, in the second position, the normally open switch is in electrical communication with the lower anchor and the segment of the electrical circuit is closed.

10. The vehicle rear seat of claim 9, each of the pair of lower anchor assemblies further comprising a non-conductive separator, the normally open switch including an electrically conductive portion and the lower anchor including an electrically conductive portion, wherein the normally open switch and the lower anchor are attached together with a non-conductive separator separating the electrically conductive portion of the normally open switch from the electrically conductive portion of the lower anchor.

11. The vehicle rear seat of claim 9, the lower anchor comprising a U-shaped terminal portion having an inside width, the normally open switch further comprising a U-shaped terminal portion also having an inside width, wherein the inside width of the U-shaped terminal portion of the lower anchor is approximately equal to the inside width of the U-shaped terminal portion of the normally open switch.

12. The vehicle rear seat of claim 11, the normally open switch including a rounded edge, wherein the rounded edge is rounded in a direction toward the lower anchor.

13. The vehicle rear seat of claim 9, the normally open switch further comprising a bend that acts as a spring maintaining the normally open switch in the first position unless forced into the second position.

14. The vehicle rear seat of claim 9 further comprising:
   a child safety seat disposed upon the bottom cushion, the child safety seat including a lower anchor attachment system including a pair of clips;
   wherein, one clip of the pair of clips is connected to one lower anchor assembly of the pair of lower anchor assemblies, forcing the normally open switch of the one lower anchor assembly to the second position; and
   wherein, the other clip of the pair of claims is connected to the other lower anchor assembly of the pair of lower anchor assemblies, forcing the normally open switch of the other lower anchor assembly to the second position.

15. The vehicle rear seat of claim 14, wherein, the child safety seat is forward-facing.

16. The vehicle rear seat of claim 14, wherein, the child safety seat is rear-facing.

17. The vehicle rear seat of claim 9, the normally open switch of each of the pair of lower anchor assemblies further comprising a bend that acts as a spring maintaining the normally open switch in the first position unless forced into the second position.

* * * * *